July 18, 1967  T. L. MAIONE ETAL  3,332,011
HIGH-FREQUENCY ELECTRICAL POWER MEASURING
BRIDGE USING RADIANT ENERGY
Filed Feb. 21, 1963

INVENTORS: T. L. MAIONE
P. S. McCABE

Patrick J. Roche
ATTORNEY

United States Patent Office

3,332,011
Patented July 18, 1967

3,332,011
HIGH-FREQUENCY ELECTRICAL POWER
MEASURING BRIDGE USING RADIANT
ENERGY
Theodore L. Maione, Little Silver, and Peter S. McCabe,
Holmdel, N.J., assignors to Bell Telephone Laboratories, Incorporated, New York, N.Y., a corporation of
New York
Filed Feb. 21, 1963, Ser. No. 260,164
1 Claim. (Cl. 324—96)

This invention relates to high-frequency electrical power measuring bridge, and more specifically to such measuring bridge using radiant energy.

Heretofore a high-frequency electrical power measuring apparatus of one type employed a thermocouple unit. It was found that such unit could be seriously damaged by a slight overload. Moreover, it was also found that the thermocouple unit did not present a precise impedance match to the load whose power was being measured. As a consequence, the thermocouple unit tended to introduce error into the measurements. Also, high-frequency power measuring apparatus of another type included a thermistor. One difficulty with this meter was that the sensitivity of the thermistor varied from unit to unit, and the measuring apparatus tended to heat the thermistor thereby tending to introduce error into the measurements.

The present invention provides improved high-frequency power measuring apparatus using radiant energy.

A principal object of the present invention is to provide a high-frequency power measuring bridge of improved accuracy.

Another object is to improve the impedance match between a high-frequency power measuring bridge and the load to which it is connected.

A further object is to improve the sensitivity of a high-frequency power measuring bridge.

Still another object is to provide an improved high-frequency power measuring bridge which is both rugged and compact.

A still further object is to provide a high-frequency power measuring bridge which is capable of absorbing overloads without impairing its accuracy.

Still another object is to provide a high-frequency power measuring bridge of simple design.

A specific embodiment of the present invention comprises a Wheatstone bridge having a source of variable light output and an adjustable resistor connected in one arm, a source of standard voltage connected to one diagonal for supplying power thereto and a null meter connected across the other diagonal, a light sensitive element sensing variations in the light output of the light source and changing its effective resistance in correspondence therewith, an ohmmeter activated by the resistance changes of the light sensitive element, a calibrated attenuator interposed between the standard voltage source and the one bridge diagonal for controlling the amount of power delivered thereto, and a supply of an unknown quantity of high-frequency power connectable to the one bridge arm in series with the light sensitive element connected therein.

In operation, with the unknown power supply disconnected from the bridge, the calibrated attenuator is adjusted to provide 0 loss in the standard voltage, and the adjustable resistor is varied to provide the one bridge arm with such amount of effective resistance as to cause the light source to supply a first amount of light output. This serves to establish balance in the bridge as indicated by a null reading on the null meter. This first amount of light output sensed by the light sensitive element also causes the latter to exhibit such first amount of effective resistance as to produce a certain reading on the ohmmeter. The power measuring bridge is now calibrated for producing a measurement. The light output of the light source comprises the light intensity or brightness of the light source and the spectral distribution.

For this purpose, the unknown power source is connected to the one bridge arm to increase the temperature of the light source and thereby the light output thereof. This change of light output sensed by the light sensitive element causes the latter to decrease its effective resistance below the first amount. This change of resistance in the light sensitive element causes the reading of the ohmmeter to vary from the certain reading. Finally, the calibrated attenuator is gradually adjusted to subtract the power supplied by the standard voltage source from the Wheatstone bridge and thereby gradually reduce the temperature of the light source until the latter supplies the first amount of light output therefrom. This re-establishes balance in the bridge. The last-mentioned light output sensed by the light sensitive element restores the first amount of resistance thereto. As a consequence, the certain reading is re-established on the ohmmeter. Now, the reading of the calibrated attenuator provides a measurement of the amount of the unknown quantity of high-frequency power applied to the Wheatstone bridge.

A feature of the invention resides in the combination of a light source of variable light output and a light sensitive element to constitute an extremely sensitive transducer as used with a conventional Wheatstone bridge and meters to obtain improved sensitivity for measuring high-frequency electrical power. It is thus apparent that small changes in the unknown power supplied to the light source in the one bridge arm effect corresponding changes in the light output of the light source and thereby small unbalances of the bridge. These light output changes sensed by the light sensitive element are reflected as relatively large changes in the effective resistance thereof and thereby as relatively large changes in the readings of a conventional ohmmeter.

Another feature involves the transducer per se operating at relatively high temperatures thereby tending to minimize the effects of ambient temperature variations on the ultimate measurements.

A further feature relates to the transducer per se which provides relatively large ohmmeter deflections in response to relatively small power inputs. The measuring bridge utilizes the light output of the light source as a function of its filament temperature and the resistance of the light sensitive element as a function of such light output while at the same time the small changes in the power dissipated in the light source are reflected as correspondingly large changes in the resistance of the light sensitive element. These latter changes effect the correspondingly large readings on the ohmmeter.

These and other objects of the invention are readily understood from the following description taken together with the accompanying drawing in which.

Figure 1B:
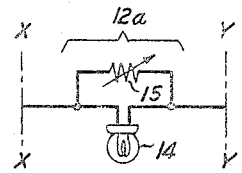
FIG. 1B is a circuit modification usable in FIG. 1A.
Figure 1A:
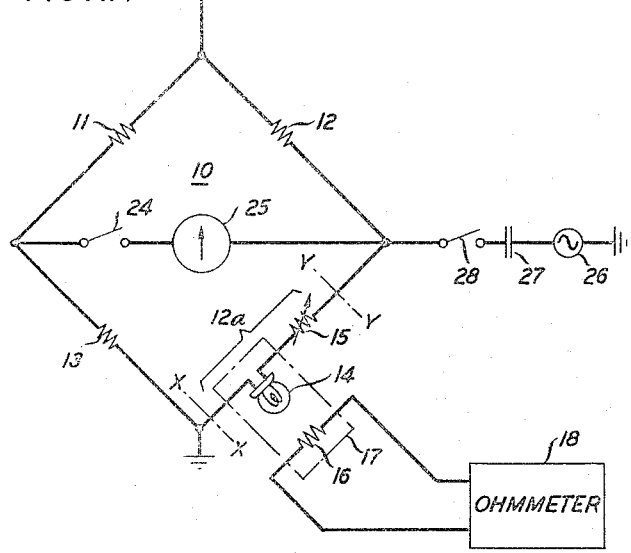
FIG. 1A is a schematic diagram of a specific embodiment of the invention.

Referring to FIG. 1A, a Wheatstone bridge 10 includes fixed resistance arms 11, 12 and 13 and a fourth arm 12a comprising a source 14 of variable light output and an adjustable resistor 15 in series. This light source and adjustable resistor may also be connected in parallel as shown in FIG. 1B. Disposed in proximity of the light source is a light sensitive element 16, both of which are contained within an enclosure 17 which is opaque to light. A conventional ohmmeter 18 is connected across the light sensitive element. A source 22 of standard and regulated direct-current voltage has its negative terminal connected to ground and its positive terminal through a calibrated attenuator 23 to one terminal of the vertical bridge diagonal whose other terminal is grounded.

A single-pole single-throw switch 24 serves to connect null meter 25 across the horizontal bridge diagonal. A supply 26 of an unknown quantity of high-frequency power to be measured has one terminal grounded and a second terminal connected through a blocking capacitor 27 and a single-pole single-throw switch 28 in series to one terminal of the one bridge arm 12a including the light source and adjustable resistor. Switch 24 is normally in the closed position.

In the initial state, switch 24 is closed to connect meter 25 across the horizontal bridge diagonal, switch 28 is open to disconnect the unknown power supply from the bridge, and the calibrated attenuator is adjusted to 0 loss regarding the power supplied to the bridge by the standard voltage source. Resistor 15 is then adjusted to establish a null reading on meter 25. In this state, the effective resistance of the bridge arm 12a is equal to that of the arm having resistor 12, while the effective resistances of the other two arms 11 and 13 are the same but different from each of the arms 12 and 12a. As a consequence, balance is established in the bridge. This bridge balance supplies a predetermined magnitude of voltage to the light source which is thereby activated to supply a certain amount of light output. This output is directed to and sensed by the light sensitive element for establishing a corresponding amount of effective resistance therein. This resistance serves to establish on the ohmmeter a first reading which, for the purpose of this illustration, is assumed to be 5,000 ohms. Thus, the certain amount of the light output of the light source is reflected as the first reading on the ohmmeter. At this point the meter is now calibrated and ready for power measurements.

For the purpose of a measurement, switch 28 is closed to connect the unknown power supply to the one bridge arm, and switch 24 is open to disconnect null meter 25 from the bridge. This supplies additional voltage to the light source which is thereby activated to increase its light output to a corresponding amount. This increased amount of light output sensed by the light sensitive element is thereby caused to reduce the effective resistance thereof to a substantially increased amount. This causes the reading of the ohmmeter to deviate a corresponding amount from the first reading, that is, to reduce its reading to 2,000 ohms, for example, for the purpose of this description. Relatively small changes of the unknown power are thus reflected as relatively large changes in the readings of the ohmmeter. Thus, the light sensitive element varies its effective resistance inversely as to the light output of the light source.

Next, the calibrated attenuator is adjusted to subtract power supplied to the bridge from the standard voltage source and thereby from the bridge arm including the light source. This is continued until the light output of the light source is reduced to the certain amount which it supplied at the time of bridge balance. At this time the power supplied from both the standard voltage source and the unknown supply to bridge arm 12a serves to re-establish the effective resistance thereof at such value as is necessary to re-establish balance in the bridge. This light output of the light source sensed by the light sensitive element establishes the effective resistance thereof at a value equal to what it was at bridge balance. As a consequence, the first reading of 5,000 ohms is re-established on the ohmmeter. The light output of the light source and the effective resistance of the light sensitive elements are thus restored to the respective values they had at the time of bridge balance or calibration.

Now, the reading of the calibrated attenuator provides a measurement in milliwatts, for this illustration, of the unknown high-frequency power originating in supply 26 and applied to bridge arm 12a. In other words, the amount of power being dissipated in the light source is precisely the amount that was being dissipated at the time of bridge balance or calibration. It is thus apparent that the light output of the light source is proportional to the power dissipated therein and thereby to its temperature and further that for small changes in the latter power very large changes are produced in the effective resistance of the light sensitive element. This tends to render the circuit extremely sensitive to measurements of relatively small inputs of unknown magnitudes of high frequency power.

Figure 2:
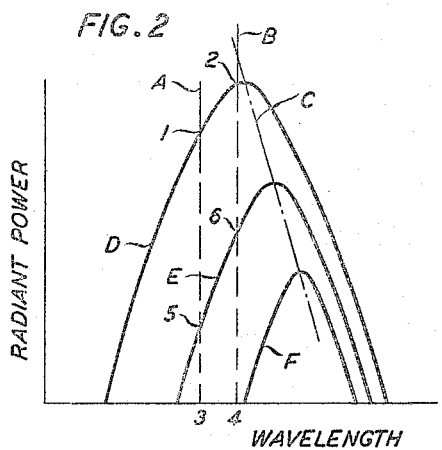
FIG. 2 is a family of curves illustrating action obtainable in FIG. 1A.

In FIG. 2 there are illustrated several light output curves for the preselected light source heated to varying amounts of temperature. The visible or useful light response lies between the two vertically parallel lines A and B, and the displacement of peak emission wavelength with varying amounts of light-source temperatures is indicated by the slant line C. Curve D represents the preselected light source heated to a first predetermined temperature of the order of 1900 degrees centigrade and providing a useful light output in the area lying between points 1, 2, 3 and 4. Curve E illustrates the preselected light source heated to a second temperature of the order of 1400 degrees centigrade and providing useful light output in the area lying between points 3, 4, 5 and 6. Curve F shows the preselected light source heated to a third temperature of the order of 900 degrees centigrade and providing no useful light output.

It is thus evident in FIG. 2 that the light output of the preselected light source varies largely with respect to the emission peak shifts of such light source when the latter is undergoing temperature changes. It is therefore apparent that the relatively large resistance changes in the light sensitive element 16 in response to small changes in the power dissipated in the light source 14 are due largely to the additive effects of:

(1) Increasing the power applied to the light source by a given percentage for causing increases in the light output emitted at any wavelength below the response peak by a percentage substantially greater than the given percentage, (2) Increasing the power applied to the light source for causing the response peak thereof to move into the response band of the light sensitive element, and (3) The specific resistance response of the light sensitive element being very high in response to small changes in the light output of the light source.

Although the specific embodiment as described above discloses the bridge arms having certain relative resistances, it is obvious that the bridge having arms of other resistance values, including equal ones, would work equally as well. Moreover, it is further obvious that while the measured power had a frequency of 20 megacles per second, power having frequencies extending down to and including the audio range as well as above 20 megacycles per second could also be expeditiously measured.

The foregoing specific embodiment included as one example the following parameters at bridge balance:

Bridge arm 11 equals 200 ohms,
Bridge arm 13 equals 200 ohms,
Bridge arm 12 equals 100 ohms,
Bridge arm 12a equals 100 ohms,
Resistor 24 equals 400 ohms.
Attenuator 23 is calibrated in decibels;
Light source 14 is a tungsten filament delivering substantially maximum light output at approximately 1900 degrees centigrade with an applied voltage of 1.35 volts and 6.75 milliamperes;
Light sensitive element 16 is a photoconductive or semiconductor element comprising a cadmium selenide cell;
Ohmmeter 18 is calibrated in ohms in the range of 0 to 10,000, and
Standard voltage source 22 is 7.777 volts.

It is to be understood that the above-described embodiment is merely illustrative of one application of the principles of the invention. Numerous other arrangements may be devised by those skilled in the art without departing from the spirit and scope of the invention.

What is claimed is:

Apparatus which comprises a bridge circuit containing first, second, third, and fourth terminals and first, second, third and fourth arms connected respectively between said fourth and first terminals, said first and second terminals, said second and third terminals, and said third and fourth terminals, said first, second and third arms containing selected resistors, and said fourth arm containing a light source and a variable resistor for adjusting the intensity of said light source, a null meter and a first single-throw switch, connected in series between said second and fourth terminals, for indicating when said bridge is in balance, a photoresistive element responsive to said light source, an opaque enclosure containing both said light source and said photoresistive element, an ohmmeter, connected in parallel to said photoresistive element, for providing a first reading of the resistance of said photoresistive element when said null meter indicates said bridge is in balance, a source of an unknown amount of power for increasing the light output of said light source and thereby decreasing the reading on said ohmmeter, means for capacitively connecting said source through a second single-throw switch between said fourth terminal and said third terminal, a standard voltage source, variable attenuating means for subtracting from said light source successive known amounts of the energy derived from said standard voltage source until the reading on said ohmmeter returns to said first reading at which time the power subtracted by said attenuator equals said unknown amount of power, and means for connecting said variable attenuating means and said voltage source between said first terminal and said third terminal.

References Cited

UNITED STATES PATENTS

| | | | |
|---|---|---|---|
| 2,417,820 | 3/1947 | Ginzton | 324—95 |
| 2,641,713 | 6/1953 | Shive | 250—211 |
| 2,773,219 | 12/1956 | Aron | 250—210 X |
| 3,141,131 | 7/1964 | McCoy | 324—96 |

OTHER REFERENCES

Publication—"Self-Contained UHF Wattmeter" by N. R. Ritchey of Advanced Dev. Labs., Sylvania Elec. Prod. Inc., December 1949, pp. 10, 11, 22 and 23 of "Engineering Dept."

WALTER L. CARLSON, *Primary Examiner.*

RUDOLPH V. ROLINEC, *Examiner.*